S. C. RIGNEY.
VEGETABLE GRADING APPARATUS.
APPLICATION FILED JULY 15, 1920.
1,382,856. Patented June 28, 1921.
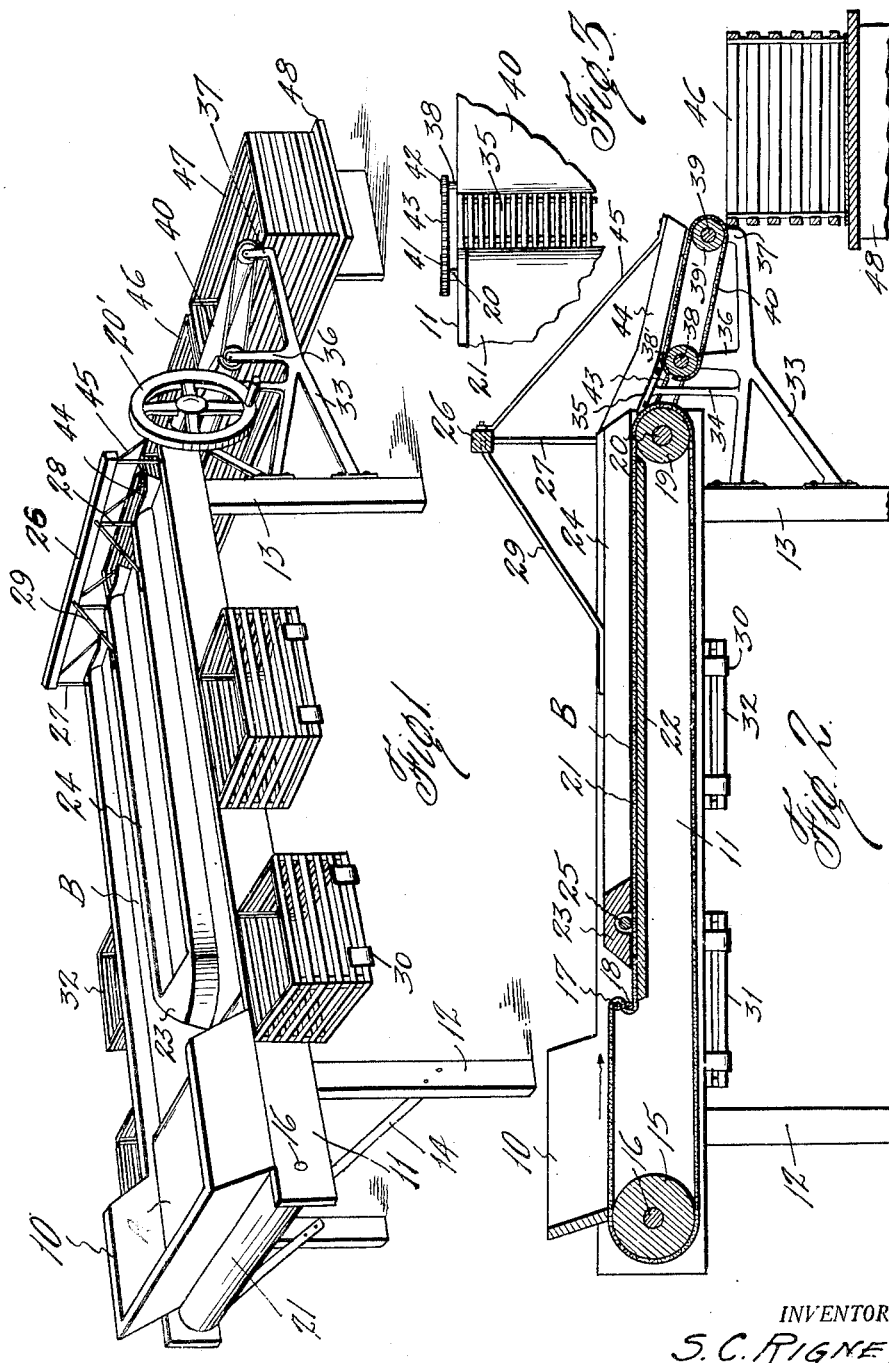
INVENTOR.
S. C. RIGNEY
BY
ATTORNEY

UNITED STATES PATENT OFFICE.

SAMUEL C. RIGNEY, OF DALLAS, TEXAS.

VEGETABLE-GRADING APPARATUS.

1,382,856.   Specification of Letters Patent.   Patented June 28, 1921.

Application filed July 15, 1920. Serial No. 396,493.

*To all whom it may concern:*

Be it known that I, SAMUEL C. RIGNEY, a citizen of the United States, residing at Dallas, in the county of Dallas and State of Texas, have invented certain new and useful Improvements in Vegetable-Grading Apparatus, of which the following is a specification.

This invention relates to new and useful improvements in vegetable grading apparatuses.

The invention has particularly to do with apparatuses for grading vegetables such as sweet potatoes and which involves the conveying of the vegetables past a point at which the first during the grading, picks out the different grades of vegetables and makes disposition of the same according to their grades. As a rule a certain grade of vegetables will predominate and, therefore, it is only necessary for the grader to pick out the other grades which constitute a substantially small percentage of the entire batch.

The purpose of my invention is to provide an apparatus for laying the vegetables past a picking point to enable the picker or grader to select the grades which are in minority and segregate the same; the majority of the vegetables being conveyed and deposited in containers.

In carrying out the invention certain novel features are involved.

In constructing an apparatus in accordance with my invention an elongated table is provided and equipped with an endless belt extending substantially the entire length of the table. The receiving end of the belt has no underlying support and thus will yield downwardly as the vegetables are discharged thereunto, thus preventing the bruising of the same. The greater length of the belt, however, has an underlying support so that the belt will travel over the same and thus be supported. The upper length of the belt travels at two elevations, the receiving end being higher thus causing the vegetables to fall and turn over as they are delivered to the lower plane of the belt. This arrangement enables the grader to see both sides of the vegetables as will be obvious. The belt is divided into channels so that vegetables may be selected from one channel and deposited into the other channel and both grades will be delivered at the end of the belt at separate points, by placing containers at ends of the channels the graded vegetables may be separately collected. Means is also provided for supporting containers or crates at the grader's position so that he may collect grades and easily deposit the same in said containers.

Another feature of the invention is provision of means whereby dirt and trash may be separated from the vegetables as the same are being conveyed to the containers. Other features will be hereinafter pointed out.

The invention will be more readily understood from a reading of the following specification and by reference to the accompanying drawings, in which an example of the invention is shown, and wherein:

Figure 1 is a perspective view of an apparatus constructed in accordance with my invention, Fig. 2 is a longitudinal sectional view of the same, and Fig. 3 is a detail in plan showing the cleaning grate and the driving connection between the conveyer belts.

In the drawings the numeral 10 designates a hopper which is mounted on the side boards 11 of a table. The side boards are mounted on front legs 12 and rear legs 13. Braces 14 extend from the legs 12 up to the side boards 11. A roller 15 is mounted on a shaft 16 having its ends supported in the forward ends of the side boards 11, whereby said roller is disposed at the forward end or head of the table. A pair of rollers 17 and 18 have their ends suitably journaled in the side boards 11 and are disposed adjacent the rear end of the hopper 10, with the roller 17 above the roller 18. A roller 19 is mounted on a shaft 20 which is mounted in the rear ends of the boards 11.

An endless belt 21 has its ends supported on the rollers 15 and 19, and passes over the roller 17, between the rollers 17 and 18 and under the latter. This causes the upper run or leg of the belt to travel in two planes at different elevations, the plane A of the belt which is between the roller 15 and the roller 18, being higher than the plane B of the belt which extends from the roller 18 to the roller 19. The vegetables to be graded are dropped or discharged upon the plane A of the belt and are conveyed rearwardly thereby. When the vegetables reach the rear end of the plane A they will fall upon the plane B and in so doing will turn over. The grader stands adjacent this point and is thus enabled to observe both sides of the vegetables. This is important because a vegetable may appear to be good on one side, while the other side will show that it is a poor grade or undesirable.

There is no support under the plane A of the belt and thus the latter is free to yield downwardly when the vegetables are discharged onto the same, thereby obviating bruising or breaking of the vegetables as will be obvious. However, under the plane B a platform or shelf 22 extends between the side boards 11 and supports the belt so that the same travels in a horizontal plane. This prevents the vegetables from rolling and crowding together and enables the grader to more easily pick out the same. A segregating member including a deflector head 23 and rearwardly extending arms 24 is mounted centrally over the plane B of the belt and extends longitudinally of the table.

In the underside of the head a transverse roller 25 is suitably mounted so as to rest on the belt 21 and support the segregating member. The deflector head 23 is curved rearwardly on each side from its center, so as to divide the vegetables and cause them to pass on each side of the arms 24. By this arrangement a channel is provided between each side board 11 and the adjacent arm 24; while between the arms 24 a central channel is formed. A cross bar 26 is mounted on posts 27 driving from the rear ends of the boards 11. Rods 28 depending from this bar engage and support the rear ends of the arms 24; while supporting braces 29 extend forwardly from said bar and are fastened to the arms 24. In this manner the segregating member is securely supported immediately above the belt, but close enough thereto, to prevent the passage of vegetables between said member and the belt.

On each side of the table outwardly extending brackets 30 are fastened to the side boards 11. The brackets are arranged in pairs and each pair is arranged to support a crate. I have shown two pairs on each side of the table. On each side of the table the forward pair of brackets are arranged to support a crate 31; while the rearward pair of brackets are arranged to support a crate 32. The grader stands between the crate 31 and 32 on each side of the table and his position is adjacent the deflector head 23. This enables him to observe the vegetables as they fall from the plane A to the plane B of the belt, and also enables him to pick out the vegetables and deposit the same in the place or in the central channel between the arms 24.

At the rear end of the table rearwardly extending standards 33 are provided and are suitably fastened to the legs 13. From each standard a post 34 extends upwardly. These posts support the ends of a downwardly inclined slatted grate 35. This grate has its upper ends overhanging the end of the belt 21 but below the upper surface so as to adequately receive the vegetables which are discharged from the end of said belt. The vegetables will slide down this grate which is comparatively short in length and any dirt and foreign matter such as nails and small stones and the like will pass between the slat of the grate and thus be removed from the vegetables.

Each standard has an upstanding arm 36 at its central portion and a similar arm 37 at its rear ends. A shaft 38 is suitably supported at the upper ends of the arms 36, while a shaft 39 is supported at the upper ends of the arms 37. The arms 37 do not extend as high as the arms 36, the shaft 39 is thus below the shaft 38. A roller 38' is mounted on the shaft 38 and a roller 39' of substantially the same diameter is mounted on the shaft 39. An endless conveyer belt 40 has its ends supported on said rollers and extends transversely of the table. By reason of the different elevations of the shafts 38 and 39, the belt 40 is inclined downwardly. The lower end of the grate 35 overhangs the forward end of the belt 40.

The shaft 20 is extended and I have shown a hand wheel 20' fastened thereon, whereby said shaft may be revolved and motion imparted to the roller 19 and the belt 21, but it is to be understood that the shaft 20 may be motor driven or revolved in any other suitable manner. On the opposite end of the shaft 20 I mount a sprocket 41, while on the adjacent end of the shaft 38 I mount a sprocket 42. An endless sprocket chain 43 connects these sprockets and serves to transmit motion to the shaft 38 whereby the belt 40 is caused to travel.

Partitions 44 extend from the rear ends of the arms 24 over the grate 35 and terminate at the rear end of the belt 40. The rear ends of the partitions are supported by braces 45 extending upwardly to the bar 26. By this arrangement the partitions are supported out of contact with the belt 40. By this arrangement the vegetables in the different channels cannot become mixed. A crate 46 is disposed between crates 47 and in position to receive the vegetables discharged from the belt 40 between the partitions 44; while the crates 47 are located to receive the vegetables discharged from the belt 40 from each side of the partitions 44. The crates may be supported on a bench or other support 48.

I will describe the operation of the device in connection with the grading of sweet potatoes in which it is customary to grade the potatoes according to size and condition, and it is usual to separate them into four grades as follows: "jumbos" which are the largest potatoes, No. 1, which are the most desirable in size and form the greater portion of the batch; No. 2 which are not so good either in shape or size or condition; and culls which are very inferior and are the lowest grade. In using my apparatus a grader stands on each side of the table between the crates 31 and 32. The sweet potatoes are dumped or discharged onto the plane A of the belt 21 which is propelled rearwardly by suitable means. The potatoes fall easily on the unsupported portion of the belt and are not bruised. The potatoes are carried rearwardly by the belt and as the same passes over the roller 17 the potato will fall onto the lower plane B of said belt, and in falling will turn over. The graders can thus see the potatoes on both planes of the belt and, therefore, can observe both sides.

The potatoes after falling on the plane B of the belt 21 are deflected by the head 23 so that part of them will pass in the channel on one side of the arms 24, and the remainder will pass in the channel on the other side. In this way the batch of potatoes is divided and each grader has only to grade those passing in the channel in front of him. The grader picks out the jumbo potatoes and places them in the central channel which is between the arms 24. He picks out the No. 2 potatoes and places them in the crate 32 and the culls he places in the crate 31. As the No. 1 potatoes constitute a large majority the grader is called upon to pick out only a comparatively few potatoes and, therefore, the work can be carried out quite rapidly. The potatoes left on the belt 21 are carried rearwardly and discharged onto the grate 35. Small stones, nails and the like will tend to fall through the grate 35 thus leaving the potatoes in a comparatively clean state to roll or slide onto the conveyer belt 40. The partitions 44 will keep the grades segregated and the potatoes will be discharged into the crates 46 and 47 in their proper order, the jumbos being received in the crate 46 and the No. 1 potatoes in the crate 47. When a crate is filled it is removed and another substituted.

This apparatus has the advantage of not only grading and cleaning the potatoes, but distributing the same in the crates in which they are to be shipped. Another advantage is that when the potatoes fall from the plane A to the plane B the vibration will tend to dislodge dirt and foreign matter clinging to the potatoes and, therefore, a better selection can be made and cleaner potatoes packed.

What I claim is:

1. In a vegetable grader, the combination with a support, of endless belt conveyer means carried by the support, said conveyer means comprising an upper belt section unsupported between its ends, and a lower belt section to receive material from the upper belt section and to permit of the turning of such material when passing thereon from the upper belt section, a supporting member arranged beneath the lower belt section to prevent downward movement thereof, segregating means extending over and longitudinally of the lower belt section to divide the same into a plurality of sections, and means to supply the vegetables to the unsupported portion of the upper belt section.

2. In a vegetable grader, the combination with a support, of an endless belt conveying means carried by the support, said conveying means comprising an upper belt section unsupported between its ends, and a lower belt section arranged near the discharge end of the upper belt section for receiving vegetables from such end which is adapted to turn the same, a support arranged beneath the lower belt section and preventing downward movement thereof, a segregating member extending longitudinally over the lower belt section and having a head and partition arms, a supporting roller carrying the head and engaging the upper surface of the lower belt section, means for supplying vegetables to the unsupported portion of the upper belt section, and means to drive the endless belt means.

3. In a vegetable grader, the combination with a support, of an upper conveyer connected therewith and unsupported between its ends to impart sufficient resiliency, a lower conveyer near the discharge end of the upper conveyer to receive the vegetables therefrom, a substantially flat supporting member beneath the lower conveyer to prevent downward movement, a segregating member extending longitudinally above the lower conveyer and embodying a permanently closed head and partition arms, a roller carried by the head and engaging the upper surface of the lower conveyer, means to feed vegetables to the unsupported portion of the upper conveyer, and means to drive said conveyer.

4. In a vegetable grader, the combination of a support, an endless belt traversing said support, a segregating member overhanging the belt and having a deflector head and partition arms, whereby the belt is divided into a plurality of channels, a substantially flat support arranged beneath that portion of the endless belt covered by the segregating member to prevent downward movement of the same, a cleaning element located at the discharge end of the conveyer belt, a second conveyer belt receiving the vegetables from the cleaning element, and partitions extending from the segregating element over the second conveyer belt for separating the vegetables discharged from the various channels of the first conveyer belt.

5. In a vegetable grader, the combination of a support, an endless belt having its upper length supported in two planes at different elevations, a hopper disposed about the upper plane of the conveyer belt, a segregating member overhanging the lower plane and the belt and dividing said belt into a plurality of channels extending rearwardly of the supports, crate supporting elements on each side of the supports, an inclined cleaning grate at the end of the conveyer belt, partitions extending over the inclined cleaning grate, a second conveyer belt inclined downward from the cleaning grate, and partitions overhanging the grate and the second belt for discharging vegetables separately from the channels of the first conveyer belt.

6. In a vegetable grader, endless belt supporting means comprising an upper belt section unsupported between its ends, and a lower belt section to receive material from the upper belt section, and a supporting member arranged beneath the lower belt section to prevent downward movement thereof.

7. In a vegetable grader, a support, an endless belt conveying means carried by the support, said conveying means comprising an upper belt section unsupported between its ends and a lower belt section receiving material from the upper belt section, a supporting member arranged beneath the lower belt section to prevent downward movement thereof, and means to supply vegetables to the unsupported portion of the upper belt section.

8. In a vegetable grader, a support, an endless belt connected therewith, a segregating member extending longitudinally over a portion of the endless belt, and a roller carried by the segregating member and supported by the belt.

In testimony whereof I affix my signature.

SAMUEL C. RIGNEY.